UNITED STATES PATENT OFFICE.

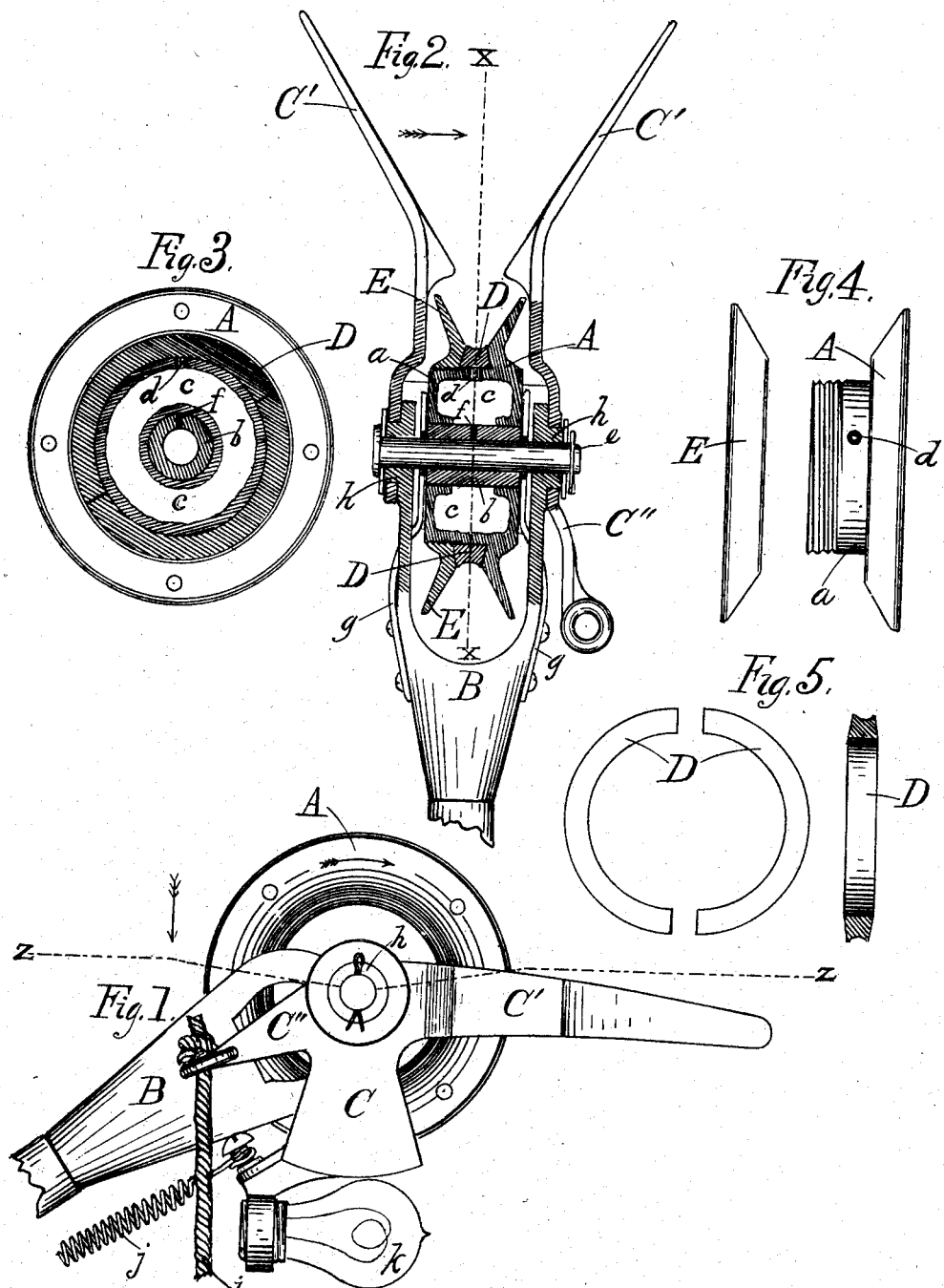

JAMES D. GIBBS, OF LOUISVILLE, KENTUCKY.

TROLLEY-HEAD.

No. 864,965.  Specification of Letters Patent.  Patented Sept. 3, 1907.

Application filed January 15, 1906. Serial No. 296,073.

*To all whom it may concern:*

Be it known that I, JAMES D. GIBBS, a citizen of the United States, residing at Louisville, in the county of Jefferson and State of Kentucky, have invented a new and useful Trolley-Head, of which the following is a specification.

My invention relates to that class of devices known to the electrical science as traveling contacts, and its objects, are, first, to increase or extend the life of the trolley wheel; second, to provide quick and easy means of placing the wheel in proper contact with the wire; and third, to prevent wheel from jumping out of contact at frogs and curves. I accomplish these objects by means of the means illustrated in the accompanying drawing, in which—

Figure 1 is a side view of the entire head; Fig. 2 is a top view sectioned on broken line Z Z of Fig. 1; Fig. 3 is a vertical section of the trolley wheel on line X X of Fig. 2; Fig. 4 is a front view of the wheel with the detachable rim or flange removed; Fig. 5 is the tread collar detached from the wheel.

Similar letters refer to similar parts throughout the several views.

The harp B may be of the usual pattern but for city railway lines I prefer a jointed or hinged harp owing to the frequency and shortness of curves; for the same reason a wheel of about five-inch diameter is preferable on city lines, but on long distance traction lines a larger wheel and harp of the customary form are well adapted.

The trolley wheel A is set and held in normal position by the usual means, but instead of using a solid wheel I form the wheel in two parts, the main casting A and the detachable flange E; the main casting A has formed on its inner surface a cylindrical, threaded hub, $a$, and the detachable flange E is threaded in a corresponding manner, whereby the flange may be readily attached or removed by means of a spanner wrench.

The center bearing of the wheel is amply protected by graphite bushing $b$, which is commonly in use, but heretofore there has been no means of protecting the tread of the wheel and to accomplish this I employ a separable or inter-changeable collar D, which may be made in the form of a ring, or in two parts, as shown; the said collar D is placed in position upon the hub $a$ and the threaded flange E is tightened upon it as shown in Fig. 2. The advantage of having the collar in two parts is that it may be attached or detached without removing the wheel from the harp. It will be observed that the inner surfaces of the two flanges adjacent to the hub are slightly beveled the object being to safely secure the collar, if in two parts, from slipping from its position.

Having thus described my invention, I claim as new, and desire to secure by Letters Patent,—

1. A trolley wheel composed of a flanged main portion having a hub, a second flange detachably engaging said hub and a collar or tread portion formed in a plurality of sections in the form of segments surrounding the hub and clamped in place thereon by the flanges, said flanges having portions overhanging the segments and the sections of the tread being renewable without removing the wheel or the flanges from the frame.

2. A trolley wheel comprising a flange having an integral hub, a flange threaded upon and adjustable on the said hub by said threaded connection, and a collar or tread portion formed in a plurality of sections in the form of segments surrounding the hub and clamped in place between the fixed and adjustable flanges, said tread portion or collar being renewable without removing the wheel or the flanges from the frame and without altering the frame from its normal condition.

JAMES D. GIBBS.

Witnesses:
JOHN K. MANN,
HORACE C. KENT.